United States Patent [19]
Narumi

[11] Patent Number: 5,249,764
[45] Date of Patent: Oct. 5, 1993

[54] COIL-END SUPPORTING APPARATUS AND A ROTARY-MACHINERY STATOR EQUIPPED WITH SAME

[75] Inventor: Eiji Narumi, Gunma, Japan

[73] Assignee: Sawafuji Electric Co., Ltd., Tokyo, Japan

[21] Appl. No.: 691,073

[22] Filed: Apr. 25, 1991

[30] Foreign Application Priority Data

Apr. 28, 1990 [JP] Japan .................................. 2-111321
Feb. 15, 1991 [JP] Japan ............................ 3-012716[U]

[51] Int. Cl.$^5$ ............................................... F16L 3/00
[52] U.S. Cl. ..................................... 248/68.1; 248/74.1
[58] Field of Search .................... 248/74.3, 68.1, 74.1, 248/74.2

Primary Examiner—Alvin C. Chin-Shue
Attorney, Agent, or Firm—McGlew and Tuttle

[57] ABSTRACT

A coil-end supporting apparatus comprising a holder comprising retainers for supporting the coil ends of a rotary machinery stator at both ends of a bar- or plate-shaped support and an insert perpendicularly intersecting the intermediate portion of the support in such a manner as to be inserted into a slot of a stator core; the holder supporting the coil ends, and a rotary-machinery stator equipped with the coil-end supporting apparatus.

3 Claims, 9 Drawing Sheets

COIL-END SUPPORTING APPARATUS AND A ROTARY-MACHINERY STATOR EQUIPPED WITH SAME

BACKGROUND OF THE INVENTION

This invention relates to a coil-end supporting apparatus for supporting the coil ends of a rotary-machinery stator having a plurality of slots extending axially provided at circumferential intervals on the internal circumferential surface of the stator core, and coils each wound across both ends of the stator core, passing through two of the slots, and a rotary-machinery stator equipped with the same.

DESCRIPTION OF THE PRIOR ART

Stators of a conventional type for rotary machinery, such as generators and motors, have heretofore employed a coil-end terminating means for connecting lead wires to the connecting ends of coils wound in the stator slots by soldering, and covering the lead wires with insulating tubes and bundling and fitting the lead wires to the coil ends.

The conventional coil-end terminating means has multiple coil ends, often in a complicated state, on both ends of the stator core, and usually leaves the coil ends in an unstable state, involves quite complex coil-end bundling operations, let alone connecting operations with lead wires, imposing problems of considerable time and labor. A plurality of lead wires are usually needed since they are used not only for feeding power to coils, but also for controlling and other purposes. This requires an unnecessarily large space for them, deteriorating the external appearance.

As a means for solving these problems, the present applicant previously proposed an improved coil-end connecting construction, as disclosed in Japanese Published Unexamined Utility Model Application No. 43745/1986.

FIG. 1 is a perspective view of the essential part of the coil-end connecting construction previously proposed by the present applicant. FIG. 2 is an enlarged front view of the essential part of FIG. 1. FIG. 3 is an enlarged exploded perspective view of component members in FIGS. 1 and 2. In these figures, reference numeral 1 refers to a stator used in rotary machinery, such as generators and motors, consisting of a cylindrical stator core 2 on which coils 3 are wound.

On the internal circumferential surface of the stator core 2 provided at circumferential intervals are a plurality of slots 4 extending along the axial direction of the stator core 2. The coil 3 is wound across both ends of the stator core 2, passing through two of the slots 4. Into an empty slot 4a inserted is a holder 5, made of a synthetic resin, with which a coupler 6 is substantially integrated. Furthermore, the coil ends 3a located at an end of the stator core 2 are supported by the holder 5.

The holder 5 consists of a support 9 extending linearly and an insert 10 perpendicularly intersecting the support 9, both formed into an almost T shape. The insert 10 is formed to have a reduced width portion the width of which is reduced from the tip to the middle thereof so that only the tip portion of the insert 10 can be inserted into the slot 4. At the tip of the insert 10 provided are a plurality of projections 11 to prevent the inserting portion 10 inserted into the slot 4 from coming off from the slot 4 with a slight external force, when the insert 10 is inserted into the slot 4. In such a holder 5, the length of the insert 10 is set so that when the tip of the insert 10 is inserted into the slot 4, the support 9 is located at a position opposite to the stator core 2 with respect to the coil end 3a. On the insert 10 provided is a vertically extending groove (not shown) for housing the connecting end of the coil 3; the connecting end being drawn out by being passed through the support 9 to connect to the coupler 6.

The coupler 6 has a plurality of male or female terminals, and a flange 12 at the bottom thereof, as shown in the figures. This type of coupler, which is well known, is placed on the holder 5 in such a fashion that the flange 12 comes in contact with the support 9. To substantially integrate both the support 9 and the coupler 6, connecting members 17 and 18 are inserted to both ends of the support 9 and the flange 12 of the coupler 6. That is, inserting holes 19 and 20 for accepting the support 9 and the flange 12 are provided on the connecting members 17 and 18. By inserting both ends of the support 9 and the flange 12 into the inserting holes 19 and 20, the holder 5 and the coupler 6 are substantially integrated with each other.

On both sides of the support 9 and on both sides of the insert 10 provided are engaging grooves 13 and 14 extending in parallel with the extending direction of the insert 10. The connecting members 17 and 18, on the other hand, have engaging pawls 15 and 16 for engaging with the engaging grooves 13 and 14 at the tip thereof in the inserting direction. These engaging pawls 15 and 16 can be resiliently bent in contact with both sides of the support 9 when the connecting members 17 and 18 are inserted into the support 9 and the coupler 6, and can be resiliently engaged with the engaging grooves 13 and 14 when the coupler 6 is substantially integrated with the support 9 to prevent the connecting members 17 and 18 from falling from the support 9.

On the connecting members 17 and 18 integrally provided are skirts 25 and 26 having arc-shaped recesses 23 and 24 for engaging with the coil end 3a; the inside surface of the arc-shaped recesses 23 and 24 having a plurality of mutually spaced ridges 27 and 28. Varnish-injecting holes 29 and 30 are proved on both sides of the skirts 25 and 26. On the connecting members 17 and 18 provided are semi-circular shoulders 31 and 32, on which fasteners 33 and 34 for fastening the coil end 3a and the connecting members 17 and 18 can be wound.

When terminating the coil 3 on the coil-end connecting apparatus having the above construction, the connecting end of the coil 3 is drawn out of the support 9 from the inserting portion 10 of the holder 5, and the insert 10 is inserted into an empty slot 4. Then, the coupler 6 is caused to come in contact with the support 9 in a state where the coupler 6 is connected to the connecting end of the coil 3. In this state, the connecting members 17 and 18 are engaged with the flange 12 of the coupler 6 and the support 9 while the recesses 23 and 24 are engaged with the coil end 3a. At this time, by engaging the engaging pawls 15 and 16 with the engaging grooves 13 and 14, the coupler 6 is substantially integrated at a predetermined position of the support 9 without the fear of the connecting members 17 and 18 falling even when an external force is exerted on the connecting members 17 and 18 in such a direction that the connecting members 17 and 18 falls from the support 9.

When varnish is injected through the varnish injecting holes 29 and 30 in this state, varnish pools are formed between the ridges 27 and 28. Thus, the connecting members 17 and 18 are integrated with the coil end 3a as varnish solidifies. Furthermore, the coupler 6 and the holder 5 are fastened with the coil end 3a by means of the fasteners 33 and 34. Electrical connection of the coil 3 is then accomplished by connecting mating coupler (not shown) to the coupler 6.

With the aforementioned coil-end connecting construction, termination of the coil 3 is very easy, the coil end 3a is positively secured and external appearance is improved. But there remain following problems.

That is, a total of six members, namely, the support 9, the connecting members 17 and 18, the coupler 6 and the fasteners 33 and 34, are required as members constituting the holder 5. This involves complex parts management, troublesome assembly operation and much time and labor.

Although the fasteners 33 and 34 are used to fasten the coil end 3a to the holder 5, the external shape of the coil end 3a may vary depending on the bundling state of strands forming the coil end 3a. As a result, the distance between the stator core 2 and the coil end 3a may vary, posing the danger of interference among the related component members disposed near the coil end 3a.

Moreover, since the direction in which the terminals are connected to the coupler 6 is limited to the upward direction, the arrangement of the coupler 6 has to be changed to change the connecting direction of the terminals. This presents the problem of insufficient flexibility.

SUMMARY OF THE INVENTION

It is the first object of this invention to provide a coil-end supporting apparatus that lends itself to easy and efficient termination of coils and improves external appearance, and a rotary machinery stator equipped with the same.

It is the second object of this invention to provide a coil-end supporting apparatus that prevents interference among related component members and facilitates assembly operations, and a rotary machinery stator equipped with the same.

It is the third object of this invention to provide a coil-end supporting apparatus that offers great freedom in selecting terminal connecting direction, and a rotary machinery stator equipped with the same.

DETAILED DESCRIPTION OF THE EMBODIMENT

Figure 1:
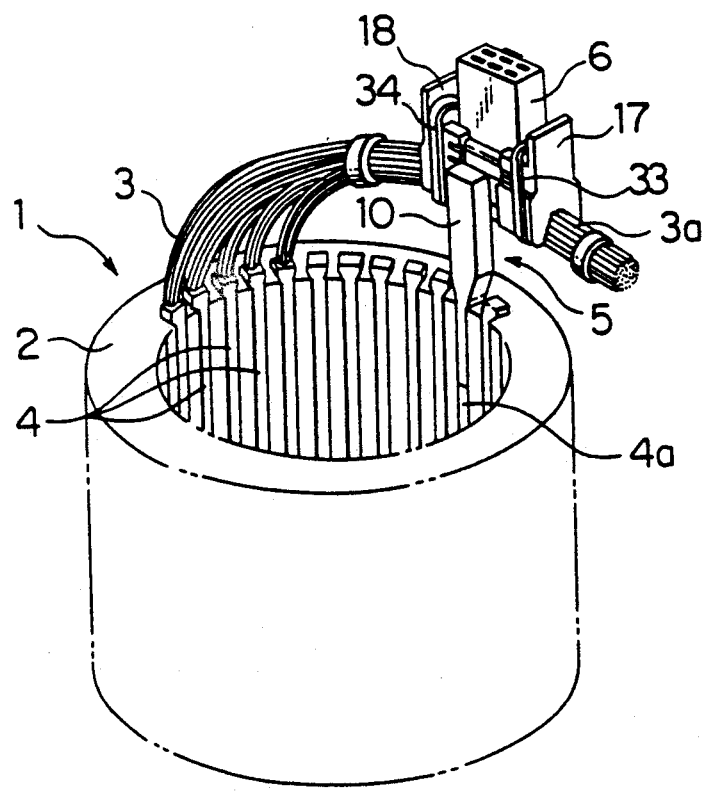
FIG. 1 is a perspective view of the essential part of a coil-end connecting construction of a conventional type.
Figure 2:
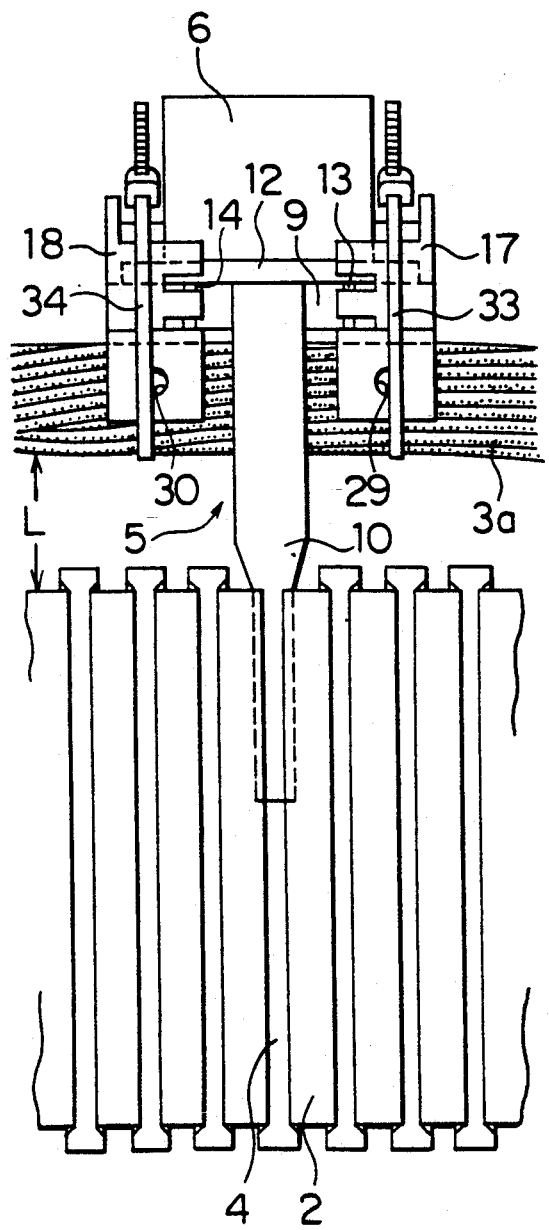
FIG. 2 is an enlarged front view of the essential part of FIG. 1.
Figure 3:
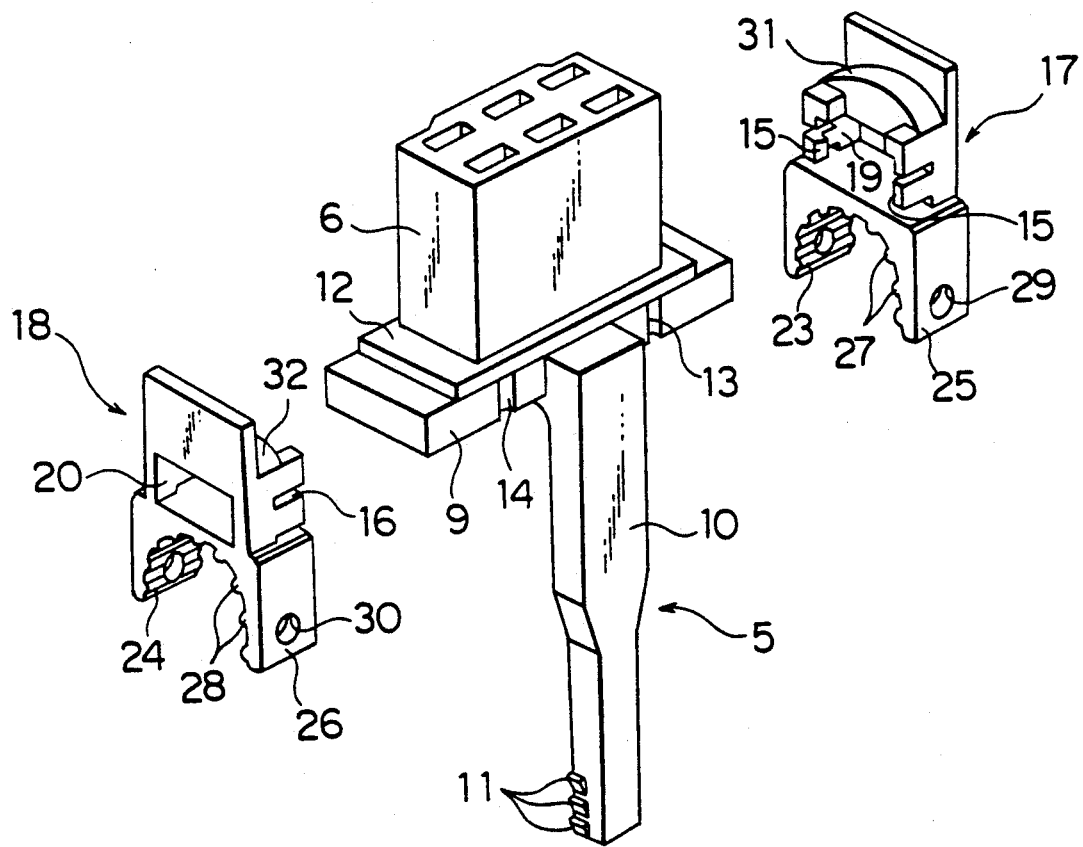
FIG. 3 is an enlarged exploded perspective view of component members used in FIG. 2.
Figure 4:
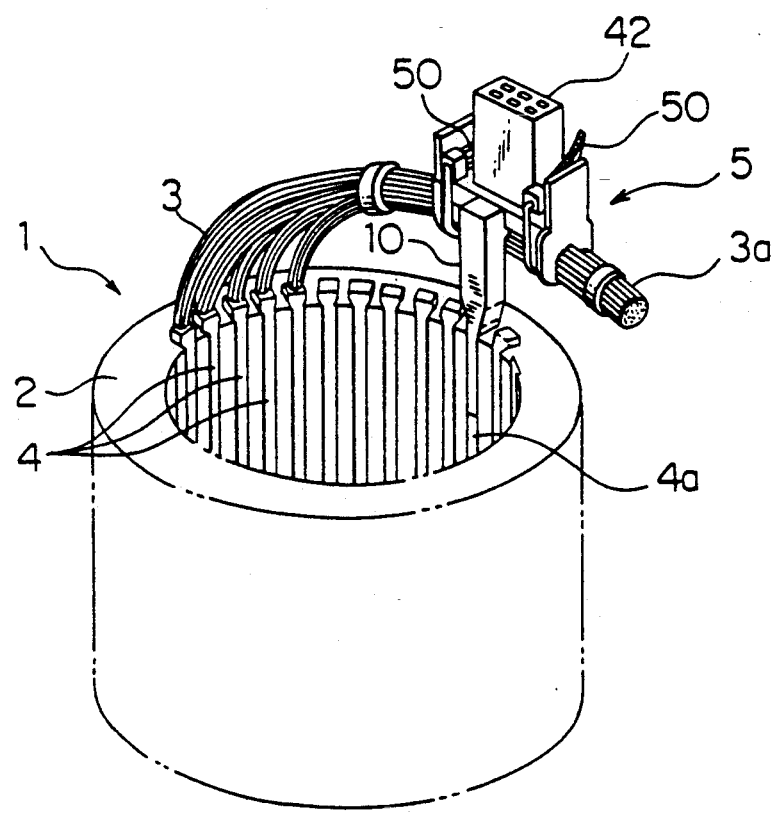
FIG. 4 is a perspective view of the essential part of an embodiment of this invention.
Figure 5:
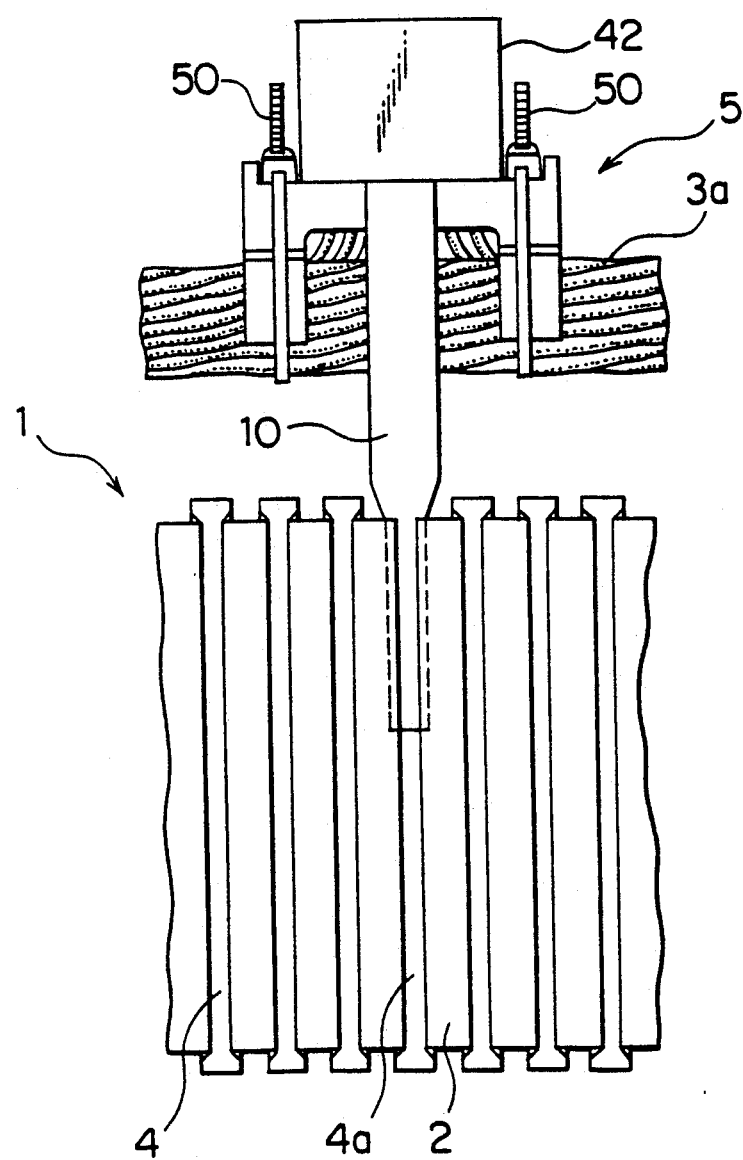
FIG. 5 is an enlarged front view of the essential part of FIG. 4.
Figure 6:
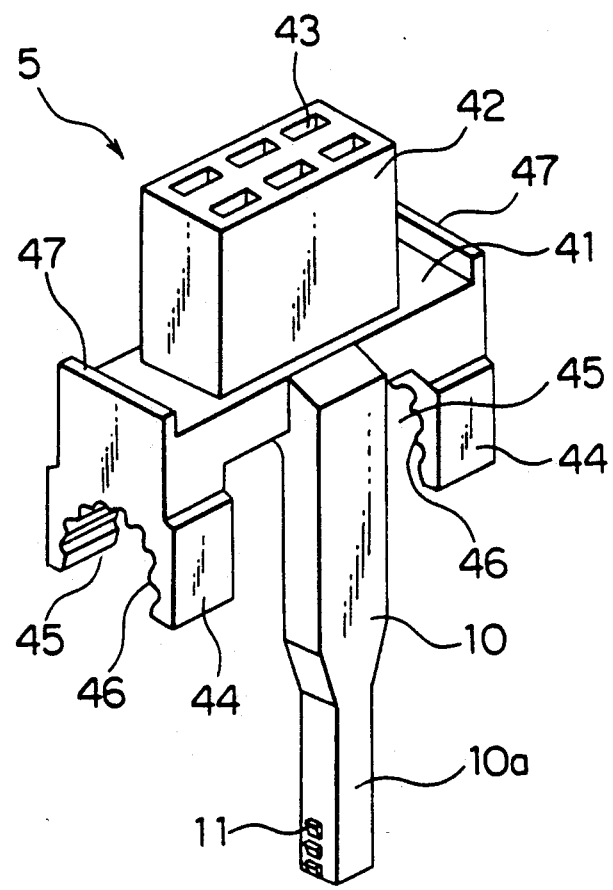
FIG. 6 is an enlarged perspective view illustrating a holder shown in FIGS. 4 and 5.

FIG. 4 is a perspective view of the essential part of an embodiment of this invention, FIG. 5 is an enlarged front view of the essential part of FIG. 4, and FIG. 6 is an enlarged perspective view illustrating a holder shown in FIGS. 4 and 5. Like parts are shown by like reference numerals shown in FIGS. 1 through 3.

In FIGS. 4 and 5, the holder 5 has a construction which will be described later, and supports the coil end 3a by fastening the coil end 3a and inserting the insert 10 into an empty slot 4a of the stator core 2.

In FIG. 6, numeral 41 refers to a support formed into a flat plate shape having a rectangular projected shape; 42 to a coupler formed into a rectangular prism, having a plurality of terminal mounts 43 for mounting male or female terminals and placed on the support 41. Through holes (not shown) for connecting the connecting end of the coil 3 shown in FIG. 4 to the male or female terminals are provided at almost the central part of the support 41 so that the through holes connect to the terminal mounts 43.

Numeral 44 refers to a skirt having recesses 45 which are formed into an arc shape so as to house the coil end 3a shown in FIGS. 4 and 5, and disposed on both sides (narrow sides) of the support 41. A plurality of mutually spaced ridges are provided on the inside surface of the arc-shaped recesses 45. Numeral 47 denotes a locking portion provided on both sides (narrow sides) of the upper surface of the support 41.

Numeral 10 is an insert provided on an edge side (broad side) at the middle of the support 41 so that the insert 10 perpendicularly intersects the upper part of the support 41 in a T shape, for example. The insert 10 has a reduced-width portion from the middle to the tip thereof so that only the tip portion 10a of the insert 10 can be inserted into the slot 4a shown in FIGS. 4 and 5. A plurality of ridges 11 are provided on the tip portion 10a of the insert 10 so as to prevent the tip portion 10a, when inserted into the slot 4a, from coming off from the slot 4a with a slight pulling force.

The length of the insert 10 and the height of the insert 10 projected from the edge side of the support 41 are set so that when the tip portion 10a of the insert 10 is inserted into the slot 4a, the support 41 matches with the coil end 3a shown in FIG. 4 and is disposed on the opposite side to the stator core 2. The support 41, the coupler 42, the skirt 44, the locking portion 47 and the insert 10 are formed integrally by an injection molding means, for example, to constitute the holder 5.

In the following, procedures for terminating the end of the coil 3 with the above-mentioned construction will be described, referring to FIGS. 4 through 6. The connecting end (not shown) of the coil 3 is aligned and trimmed to a predetermined length and connected by soldering or a solderless connecting means to a male or female terminal (not shown); and the terminal is fixedly fitted to the terminal mount 43 of the coupler 42 through the through hole (not shown) on the support 41.

Next, the insert 10 of the holder 5 is inserted or fitted into an empty slot 4a of the stator core 2, and the coil end 3a is housed in the arc-shaped recess 45 and fastened to the support 41. Then, by connecting the coupler 42 to the matching coupler (not shown), electrical connection of the coil 3 is completed. The aforementioned construction makes it possible to facilitate termination of the coil 3, positively secure the coil end 3a, and improve external appearance.

Figure 7:
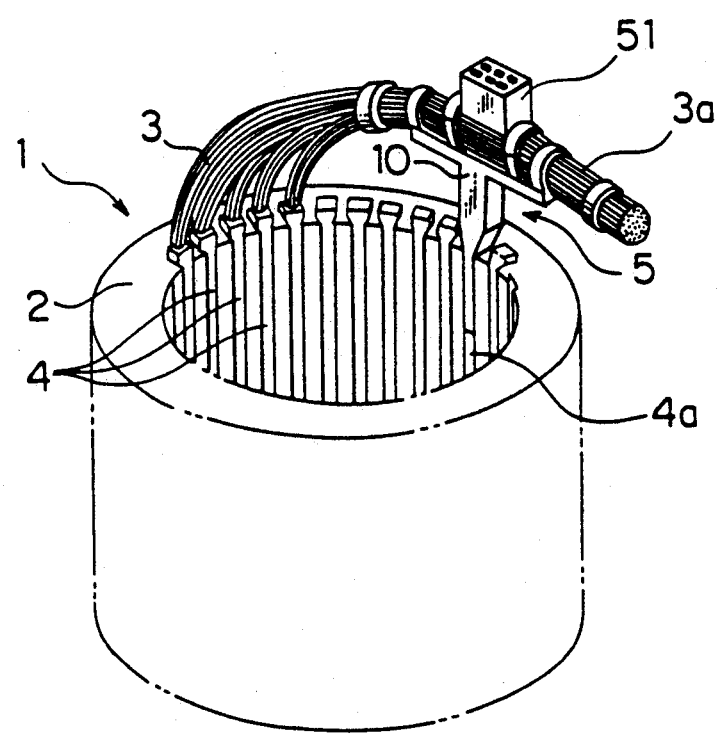
FIG. 7 is a perspective view of the essential part of another embodiment of this invention.
Figure 8:
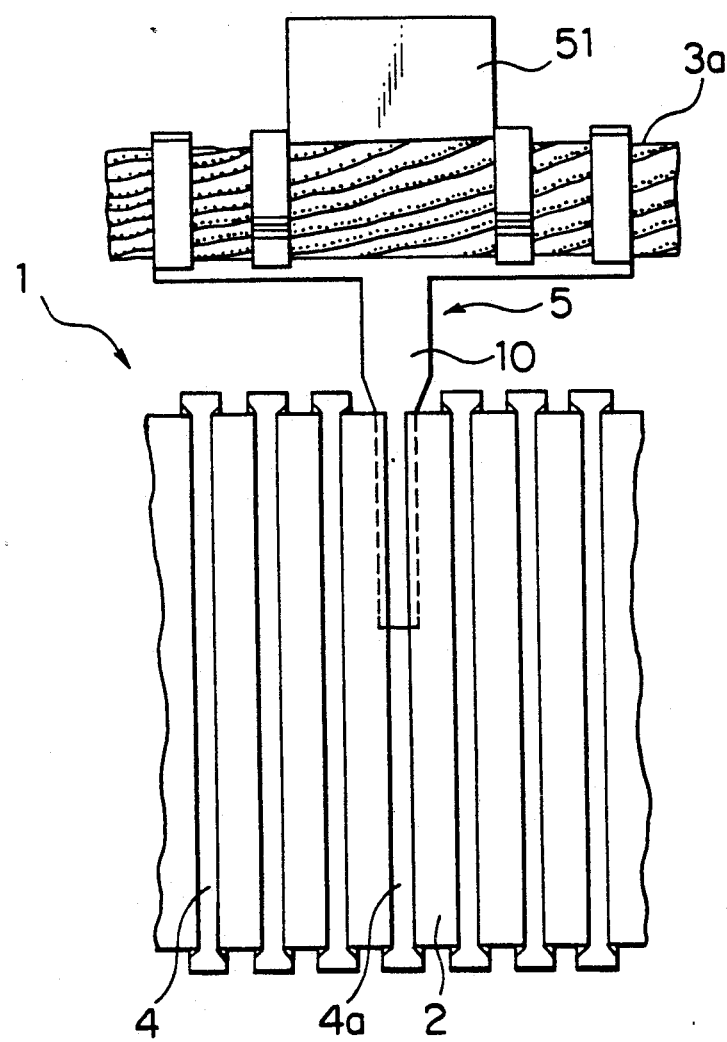
FIG. 8 is an enlarged front view of the essential part of FIG. 7.
Figure 9:
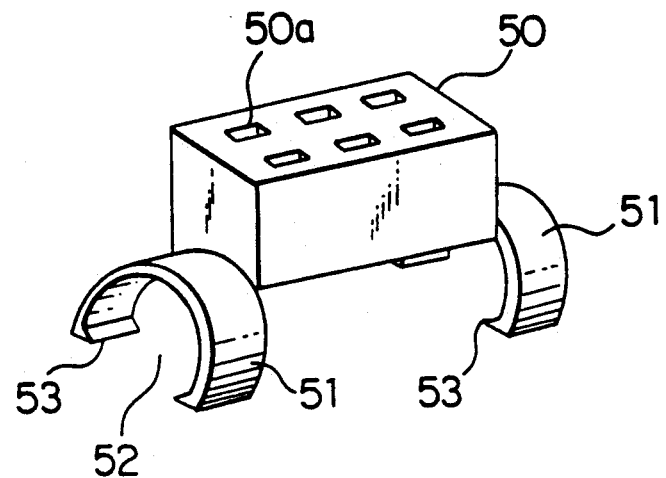
FIG. 9 is an enlarged perspective view illustrating a coupler shown in FIGS. 7 and 8.
Figure 10:
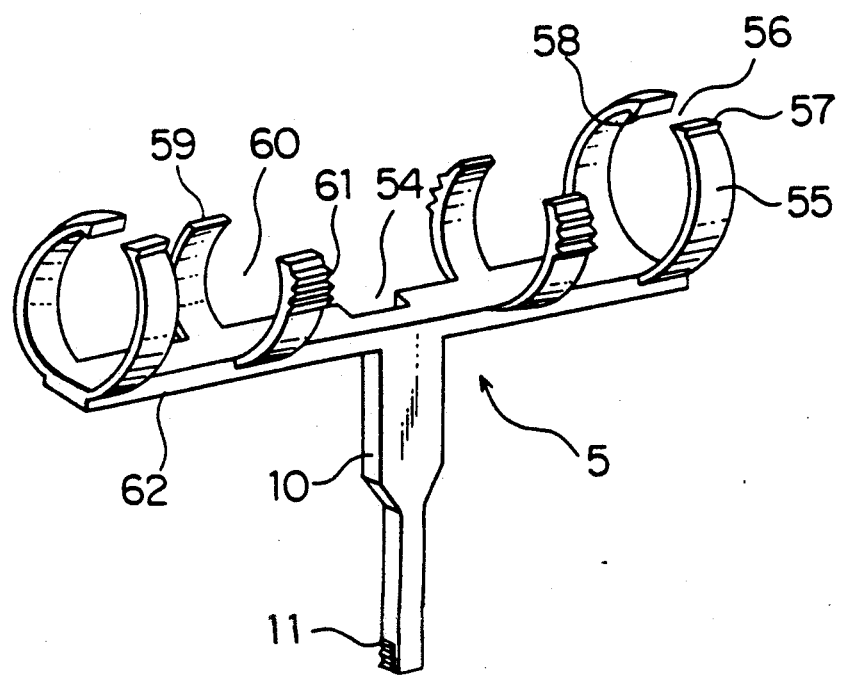
FIG. 10 is an enlarged perspective view illustrating a holder shown in FIGS. 7 and 8.

FIG. 7 is a perspective view of the essential part of another embodiment of this invention, FIG. 8 is an enlarged front view of the essential part of FIG. 7, and FIGS. 9 and 10 are enlarged perspective view illustrating the coupler and the holder shown in FIGS. 7 and 8. Like parts are indicated by like numerals shown in FIGS. 4 through 6.

In FIGS. 7 and 8, the holder 5 and the coupler 50 are constructed as will be described later. Like the abovementioned embodiment, the coil end 3a is supported by fastening the coil end 3a, and inserting the insert 10 into an empty slot 4a of the stator core 2.

In FIG. 9, numeral 51 refers to a connecting portion provided integrally at an end in the longitudinal direction of the coupler 50. The connecting portion 51 is formed into a semi-circular shape having an opening 52, and an engaging pawl 53 is provided on the connecting portion 51 in such a fashion as to protrude outwardly so that the engaging pawl 53 can be engaged with the connecting part of the holder 5, which will be described later. Numeral 50a denotes a terminal mount provided on the upper part of the coupler 50.

In FIG. 10, the support 62 is formed into a bar or flat plate shape, and has an insert 10 in the middle of the support 62 in such a fashion as to perpendicularly intersect the longitudinal direction of the support 62. Numeral 54 denotes a notch passing through the middle part of the support 62. The notch 54 allows lead wires for connecting the coil 3 shown in FIG. 7 and the coupler 50 shown in FIG. 9 to pass.

Numeral 55 denotes an arc-shaped retainer provided on each end of the support 62 in the longitudinal direction. The arc-shaped retainer 55 is formed into a semi-circular shape with an opening 56 directed upward. Engaging portions 57 and 58 formed in such a manner as to engage with each other are provided on both sides of the opening 56. The inside dimensions and shape of the arc-shaped retainer 55 is determined appropriately in such a manner as to hold the coil end 3a shown in FIGS. 7 and 8.

Numeral 59 denotes a connecting portion provided between the arc-shaped retainer 55 and the insert 10. The connecting portion 59 is formed into a semi-circular shape with an opening 60 directed upward. On the external circumferential surface provided are a plurality of engaging portions 61. The connecting portion 59 is formed in such a fashion as to connect with the connecting portion 51 shown in FIG. 9 and to allow the engaging pawl 53 to engage with the engaging portion 61.

The support 62, the insert 10, the arc-shaped retainer 55 and the connecting portion 59 are formed integrally to constitute the holder 5. As a means to form these, an injection molding means using thermoplastic resin, such as nylon 6, is effective.

In the following, procedures for terminating the coil 3 with the aforementioned construction will be described, referring to FIGS. 7 through 10. The insert 10 of the holder 5 is inserted or fitted into an empty slot 4a of the stator core 2. Next, the connecting end (not shown) of the coil 3 is aligned and trimmed to a predetermined length, connected to a male or female terminal (not shown) by soldering or a solderless connecting means, and the terminal is fitted to the terminal mount 50a of the coupler 50 through the notch 54 of the support 62. The coil end 3a is housed in the arc-shaped retainer 55 and the connecting portion 59. In this state, the coil end 3a is easily housed since the arc-shaped retainer 55 and the connecting portion 59 have the openings 56 and 60.

Next, the opening 56 of the arc-shaped retainer 55 is closed and the engaging portions 57 and 58 are engaged with each other to hold and fasten the coil end 3a. As the coupler 50 is forced onto the holder 5, the connecting portion 51 is fitted to the connecting portion 59 and the engaging pawl 53 engages with the engaging portion 61, and thus the coupler 50 is fixedly fitted to the holder 5. By matching the coupler 50 with the mating coupler (not shown), electrical connection of the coil 3 is completed.

With the aforementioned construction, termination of the coil 3 is facilitated, the coil end 3a is positively secured, and external appearance is improved.

In the foregoing description of this embodiment, component members of the holder as a coil-end supporting apparatus are integrally formed by an injection molding means, but they can be molded by cast molding, compression molding and other molding means. Also, they can be formed by first separately molding part of whole of the component members, and then assembling them into an integral piece using adhesive, etc. The shape and dimensions of each component member may be selected appropriately, depending on the shape and dimensions of the rotary machinery stator to which the component members are applied, and are not limited to those described in this embodiment.

In this embodiment, furthermore, upwardly opened openings of the arc-shaped retainer and the connecting portion have been described, but the opening direction of these openings is not limited to it. These openings directed obliquely upward or sideward may serve the purpose of allowing the coil end to pass.

This invention having the aforementioned construction and operation can achieve the following effects.

(1) Coils can be easily and positively terminated, coil ends can be positively secured, and external appearance can be improved.

(2) By adopting the construction of supporting coil ends from underside by the holder, the distance between the stator core and the coil ends can be kept constant, thus eliminating the interference with related component members disposed nearby.

(3) The use of a few members to form a coil-end supporting apparatus facilitates assembly operation and substantially reduces man-hours and time.

(4) By changing the fitting direction of the coupler, the direction of connecting terminals can be changed, and the degree of freedom can be increased.

What is claimed is:

1. A coil-end supporting apparatus, comprising: a plate-shaped support having a first end and a second end; a first locking portion extending downwardly from said first end of said plate-shaped support and a second locking portion extending downwardly from said second end of said plate-shaped support, each of said first locking portion and said second locking portion having a skirt defining a recess for holding coil ends, said skirt providing a surface without varnish injecting holes; a terminal mount provided on an upper surface of said plate-shaped support; fasteners including a first fastener and a second fastener, said first fastener being positioned on a first substantially flat surface between said terminal mount and said first end of said plate-shaped support and extending over said skirt of said first locking portion, said second fastener being positioned on a second substantially flat surface between said terminal mount and said second end of said plate-shaped support, and extending downwardly over said skirt of said second locking portion for urging portions of each of said skirts toward each other to maintain said coil within said locking portion; an insert including an end insertable into a slot of a stator core, said insert extending downwardly on an edge side of a middle part of said plate-shaped support, said insert extending substantially perpendicularly with respect to a surface of said plate-shaped support, said first and second locking portions, said plate-shaped support and said insert being formed integral to provide a coupler formed of a single piece.

2. A coil-end supporting apparatus, comprising: a plate shaped support having a first end and a second end; a first locking portion extending downwardly from said first end of said plate-shaped support and a second locking portion extending downwardly from said second end of said plate-shaped support, each of said first locking portion and said second locking portion comprising a skirt with skirt portions with an uninterrupted skirt surface and an interior surface defining a recess for holding coil ends; a terminal mount provided on a substantially flat upper surface of said plate-shaped support; fasteners including a first fastener and a second fastener, said first fastener being positioned in contact with said substantially flat surface of said plate-shaped support between said terminal mount and said first end and extending over said skirt of said first locking portion, said second fastener being positioned in contact with said substantially flat surface of said plate-shaped support between said terminal mount and said second end, and extending downwardly over said skirt of said second locking portion for urging said skirt portions toward each other to maintain said coil within said locking portion; an insert including an end insertable into a slot of a stator core, said insert extending downwardly on an edge side of a middle part of said plate-shaped support, said insert extending substantially perpendicularly with respect to a surface of said plate-shaped support, said first and second locking portions, said plate-shaped support and said insert being formed integral to provide a coupler formed of a single piece.

3. A coil-end supporting apparatus, comprising: a plate shaped support having a first end and a second end; a first locking portion extending downwardly from said first end of said plate-shaped support and a second locking portion extending downwardly from said second end of said plate-shaped support, each of said first locking portion and said second locking portion comprising a skirt with opposing surfaces continuing uninterrupted from said plate shaped support to a lower skirt end, said surfaces defining a recess for holding coil ends; a terminal mount provided on a substantially flat upper surface of said plate-shaped support; fasteners including a first fastener and a second fastener, said first fastener being connected to and supported on said substantially flat upper surface of said plate shaped support and positioned between said terminal mount and said first end and extending over said skirt of said first locking portion, said second fastener being connected to and supported on said substantially flat upper surface of said plate-shaped support positioned between said terminal mount and said second end, and extending downwardly over said skirt of said second locking portion for urging portions of each of said skirts toward each other to maintain said coil within said locking portion; an insert including an end insertable into a slot of a stator core, said insert extending downwardly on an edge side of a middle part of said plate-shaped support, said insert extending substantially perpendicularly with respect a surface of said plate-shaped support, said first and second locking portions, said plate-shaped support and said insert being formed integral to provide a coupler formed of a single piece.

* * * * *